UNITED STATES PATENT OFFICE.

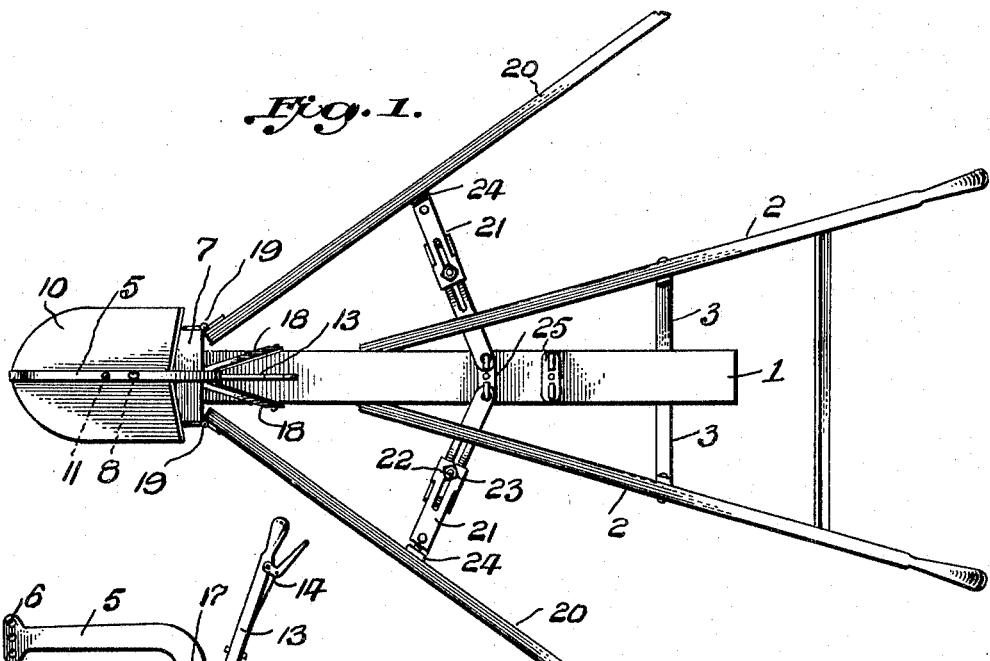
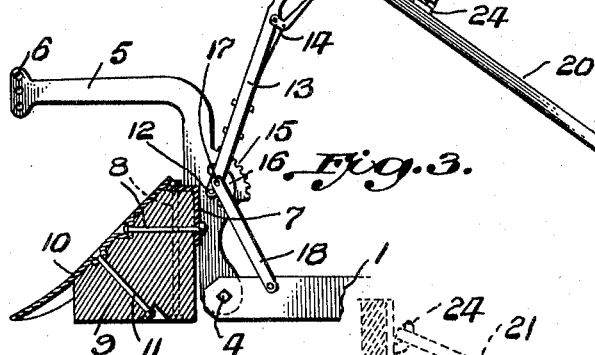
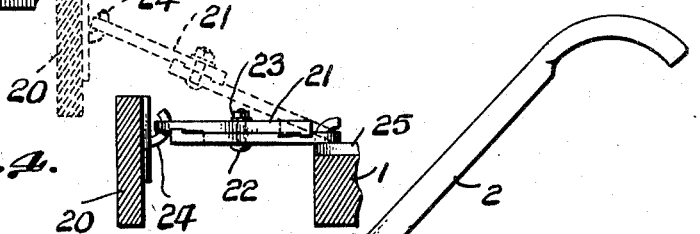
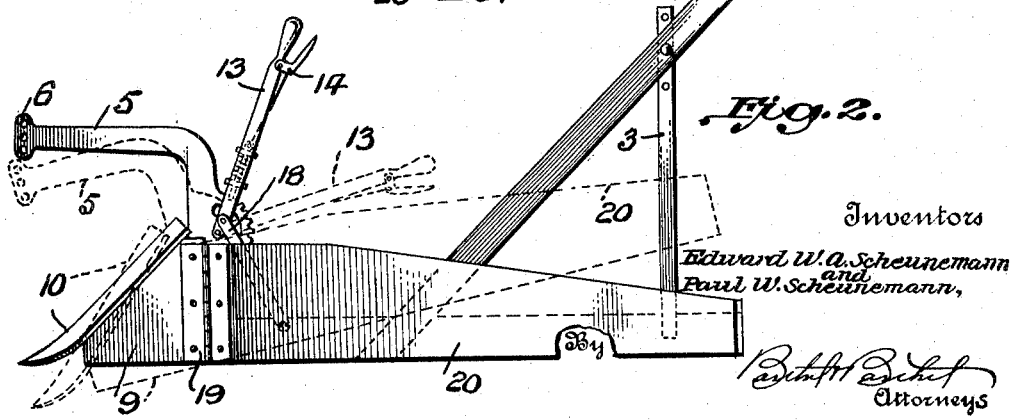

EDWARD W. A. SCHEUNEMANN AND PAUL W. SCHEUNEMANN, OF NEW HAVEN, MICHIGAN.

AGRICULTURAL IMPLEMENT.

1,325,703. Specification of Letters Patent. Patented Dec. 23, 1919.

Application filed April 23, 1919. Serial No. 293,162.

*To all whom it may concern:*

Be it known that we, EDWARD W. A. SCHEUNEMANN and PAUL W. SCHEUNEMANN, citizens of the United States of America, residing at New Haven, in the county of Macomb and State of Michigan, have invented certain new and useful Improvements in Agricultural Implements, of which the following is a specification, reference being had therein to the accompanying drawings.

The primary object of our invention is to provide a novel adjustable ditching machine which may be advantageously used by farmers, road builders and others for producing drain ditches, furrows, gutters and the like and maintain the same clean.

Another object of our invention is to provide an adjustable ditcher and scraper that may be employed for hilling and banking growing vegetables and other plants, the ditcher or scraper being adjustable so that it may be set to till or agitate the soil at a desired depth and scrape or shift the loose soil a desired lateral distance, so that the machine may be safely operated between rows of growing plants.

A further object of our invention is to accomplish the above results by a strong and durable agricultural implement that may be drawn similar to a plow by animals or motive power, and this implement will be hereinafter specifically described and then claimed.

Reference will now be had to the drawing, wherein—

Figure 1 is a plan of the adjustable ditching implement;

Fig. 2 is a side elevation of the same, showing parts thereof in adjusted positions by dash lines;

Fig. 3 is a longitudinal sectional view of a portion of the implement, and

Fig. 4 is a cross sectional view of another portion of the implement.

In the drawing, the reference numeral 1 denotes a longitudinal runner and connected to the sides of said runner, intermediate the ends thereof, are the lower ends of upwardly extending diverging handle bars 2, somewhat similar to the handle bars of a plow, and the handle bars 2 are connected to the rear end of the runner 1 by angularly disposed braces 3.

Pivotally connected to the forward end of the runner 1 by a bolt 4 or other pivotal means is the lower end of an angular beam having a clevis 6 at its upper end, so that a team of horses or tractor may be attached thereto for pulling the runner 1 over the soil. The beam 5, has the front side thereof provided with a transverse angle bracket 7. Connected to said angle bracket by vertical and longitudinally disposed bolts 8 is a head 9. The forward end of said head has angularly disposed faces or seats for a shovel member or plow share 10 which is held in engagement with the head 9 by angularly disposed bolts 11 which may coöperate with longitudinal bolts 8 in retaining the shovel point and head in a fixed position relative to the angle bracket 7.

Pivotally connected to one side of the draft frame 5, as at 12, is a lever 13 having a conventional form of locking mechanism 14 adapted to engage a sector rack 15 of the beam 5 and hold the lever 13 in a set position. The sector rack 15 is slotted, as at 16, so as to provide clearance for a transverse pin 17, carried by the lever 13. Pivotally connected to the ends of the pin 17 are side links 18 that extend to the runner 1 and are pivotally connected thereto, so that the lever 13 may be manipulated to change the angularity of the draft frame 5 relative to the runner 1, as shown by dash lines in Fig. 2 of the drawings.

Hinged to the rear vertical edges of the head 9, as at 19, are the forward ends of scrapers or mold boards 20 that extend rearwardly at an angle to the runner 1 and are capable of adjustment whereby the rear ends of said scrapers may be shifted to and from the rear end of the runner 1. To hold the scrapers 20 in adjusted position detachable and extensible braces are employed, each brace consisting of two slide members 21 adjustably connected together by a bolt 22 and a nut 23. The members of the brace have apertured ends adapted to engage over hook shaped members 24 of the scrapers 20 and hook shaped members 25 of the runner 1, there being two of the hook shaped members on the runner 1 so that the inner ends of the braces may be shifted from one member to the other and thus permit of the braces holding the scrapers at a desired angle relative to the runner.

Since the forward ends of the scrapers or mold board 20 are carried by the head 9 and said head adjustable relative to the runner 1, it is apparent that the scrapers 20 can be shifted in a plane at a right angle to the horizontal plane of the runner 1 and this permits of the runner 1 traveling on the bottom of a ditch or furrow while the scrapers or mold boards 20 extend upwardly along the side walls of the ditch or furrow. With the head 9 adjusted to place the forward end of the shovel point or plow share in the ground, said shovel point has the action of a plow to agitate the soil, throw the soil to the side of the implement, and permit of the scrapers 20 forcing it out of the ditch or furrow, so as to clean the same.

In the cultivation of plants sufficient soil can be removed by the shovel point so that the scrapers may hill or bank the plants, and it is in this connection that the implement may be used for cultivating purposes.

It is thought that the operation and utility of our implement will be apparent without further description, and while in the drawing there is illustrated a preferred embodiment of our invention, it is to be understood that the structural elements are susceptible to such variations and modifications as fall within the scope of the appended claim.

What we claim is:—

An implement of the character described, comprising a runner, an angular beam having its lower end pivotally connected to the forward end of said runner, an angle bracket on the front side of the lower portion of said angular beam, a head fixed to said angle bracket, a shovel point connected to said head, scrapers having the forward ends thereof connected to said head, a lever carried by the lower portion of said beam in proximity to said bracket, connections between said lever and said runner so that said lever may be manually adjusted to tilt said beam and the head thereof in a vertical plane relative to said runner, and adjustable braces between said runner and said scrapers.

In testimony whereof we affix our signatures in presence of two witnesses.

EDWARD W. A. SCHEUNEMANN.
PAUL W. SCHEUNEMANN.

Witnesses:
ANN NEUMANN,
Mrs. W. SCHEUNEMANN.